(12) United States Patent
Takahira et al.

(10) Patent No.: US 6,395,360 B1
(45) Date of Patent: May 28, 2002

(54) RELEASE LINER AND PRESSURE-SENSITIVE ADHESIVE SHEET

(75) Inventors: Hitoshi Takahira; Hiroshi Yamamoto; Naoyuki Nishiyama; Masahiro Ohura, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/471,282

(22) Filed: Dec. 23, 1999

(30) Foreign Application Priority Data

Dec. 25, 1998 (JP) .......................................... 10-369136
Sep. 22, 1999 (JP) .......................................... 11-268179

(51) Int. Cl.⁷ ................................................ B32B 9/00
(52) U.S. Cl. .................... 428/40.1; 428/41.7; 428/41.8; 428/41.94; 428/352; 428/354
(58) Field of Search ............................. 428/40.1, 41.7, 428/41.8, 41.9, 906, 352, 354

(56) References Cited

U.S. PATENT DOCUMENTS 5,817,386 A    10/1998   Adamko et al.

FOREIGN PATENT DOCUMENTS

| | | |
|---|---|---|
| EP | 0 460 841 A2 | 12/1991 |
| JP | 5-4916 * | 1/1993 |
| WO | WO 95/20635 | 8/1995 |
| WO | WO 99/38930 | 8/1999 |

OTHER PUBLICATIONS

Patent Abstract of Japan (10–121011) No Date.
European Search Report No Date.

* cited by examiner

Primary Examiner—Nasser Ahmad
(74) Attorney, Agent, or Firm—Sughrue, Mion, PLLC

(57) ABSTRACT

Provided is a release liner formed of a plastic film having a laminated structure of at least three layers, described specifically, as two surface layers, (A) a release functioning layer composed of a polyethylene film having a density of 0.88 to 0.92 g/cm³ and a melt index not greater than 10 g/10 minutes and (B) a surface film layer having a thermal linear expansion coefficient similar to that of said release functioning layer and, as an intermediate layer, (C) a reinforcement layer having a melting point not less than 120° C. By forming a pressure-sensitive adhesive layer on the surface of the release functioning layer (A) of the above-described release liner, a pressure-sensitive adhesive sheet can be obtained. The release liner exhibits good release function without using a silicone-base releasing agent and has heat resistance sufficient for not causing deformation such as curl even when heat is applied to the liner.

6 Claims, 1 Drawing Sheet

RELEASE LINER AND PRESSURE-SENSITIVE ADHESIVE SHEET

FIELD OF THE INVENTION

This invention relates to a release liner and a pressure-sensitive adhesive sheet comprising the release liner as a constitutional member. In particular, the present invention pertains to a release liner suitably employed for the assembly of an electronic device such as magnetic recording device (HDD) easily damaged by contamination of silicone.

BACKGROUND OF THE INVENTION

Pressure-sensitive adhesive sheets such as pressure-sensitive adhesive double bond tape used for the bonding of various goods have a release liner stacked on the surface of its adhesive layer in order to protect the adhesive layer until actual use. As such a release liner, ordinarily employed is that obtained by applying, as a releasing agent, a silicone-base releasing agent to a base material such as paper or plastic film.

In recent days, pressure-sensitive adhesive sheets have come to be used even for the fabrication of precision electronic parts (devices) such as magnetic recording device (HDD). When used for such a purpose, removal of a silicone-base material from the constitutional members of the pressure-sensitive adhesive sheet is required for preventing contact point failure or head crash failure of a magnetic disc.

Among the constitutional members of a pressure-sensitive adhesive sheet, a silicone-base material being used most frequently is a silicone-base releasing agent as a releasing agent for a release liner etc. Accordingly, the most effective means to satisfy the above-described requirement is not to use a silicone-base releasing agent.

As means free from the use of a silicone-base releasing agent, use of a fluorine-base releasing agent or long-chain alkyl base releasing agent for a release liner or use of, as a release liner, a plastic film made of a polyolefin having a low adhesive force such as polyethylene or polypropylene can be considered. The use of a fluorine-base releasing agent is however accompanied with the problem that since it is expensive, cost of the release liner obtained using it becomes high. The use of a long-chain alkyl type releasing agent is also accompanied with the problem that a higher force is required for peeling off the release liner having it compared with a release liner having the silicone-base releasing agent.

It has already been found that in the case where a polyolefin-base plastic film is used as a release liner, some plastic films having a specific composition can be used as a release liner which requires only a low peeling force (excellent releasing function), but they tend to involve a problem in heat resistance. For example, when heat is applied to a release liner in the production step of a pressure-sensitive adhesive sheet, such a release liner tends to curl and its original shape cannot be maintained easily, which makes it difficult to maintain the appearance quality of the pressure-sensitive adhesive sheet. When heat is applied to a release liner in the assembly step of parts or the like, deformation of the pressure-sensitive adhesive sheet occurs on the line of the automatic assembly step, leading to a step failure. In addition, when a polyolefin-base plastic film used as a release liner or a pressure-sensitive adhesive sheet having it as a constitutional member is stored in the rolled form, adhesion (blocking) occurs between the release liners, resulting in difficulty in unwinding.

SUMMARY OF THE INVENTION

An object of the present invention is therefore to provide a release liner which exhibits good release function even without using a silicone-base material such as a silicone-base releasing agent and has heat resistance sufficient for preventing deformation such as curl even when heat is applied; and a pressure-sensitive adhesive sheet comprising the release liner as a constitutional member.

Another object of the present invention is to provide a release liner which has the above-described properties and in addition, does not cause blocking easily even when stored in the rolled form; and a pressure-sensitive adhesive sheet comprising the release liner as a constitutional member.

With a view to attaining the above-described objects, the present inventors have carried out an extensive investigation. As a result, it has been found that a release liner having good releasing properties and high heat resistance can be obtained even without using a silicone-base material, by forming its release layer to have a laminated structure of three layers and constituting each layer from a film layer having specific physical properties, leading to the completion of the present invention.

In one aspect of the present invention, there is thus provided a release liner which comprises a plastic film having a laminated structure of at least three layers, wherein the two surface layers of the release liner are (A) a release functioning layer composed of a polyethylene film having a density of 0.88 to 0.92 g/cm$^3$ and a melt index not greater than 10 g/10 min. and (B) a surface film layer having a thermal linear expansion coefficient similar to that of the release functioning layer; and the intermediate layer is (C) a reinforcement layer having a melting point not less than 120° C.

In another aspect of the present invention, there is also provided the above-described release liner, wherein the surface film layer (B) is formed from a material different from that of the release functioning layer (A). In a further aspect of the present invention, there is also provided a pressure-sensitive adhesive sheet having a pressure-sensitive adhesive layer formed on the surface of, the release functioning layer (A) of the above-described release liner. The modulus of elasticity of the pressure-sensitive adhesive sheet at 23° C. is, for example, about 1×10$^4$ to 1×10$^6$ dyn/cm$^2$. This pressure-sensitive adhesive sheet can be used, for example, as a pressure-sensitive adhesive sheet for a hard disc device of a computer.

In the present invention, since a release liner has a laminated structure of at least three layers and each of these three layers is composed of a film layer having specific physical properties, it exhibits a good release function even without using a silicone-base material and at the same time, has excellent in processing properties and heat resistance so that deformation such as curl does not occur easily even when heat is applied to it. It can therefore be used suitably for the bonding of electronic parts easily damaged by contamination of silicone. In addition, by forming the release functioning layer and surface film layer, which constitute two surface layers of the release liner, from different materials, blocking of the release liner in the rolled form can be prevented effectively.

DETAILED DESCRIPTION OF THE INVENTION

The embodiments of the present invention will hereinafter be described with reference to accompanying drawings as needed.

Release Liner

Figure 1:
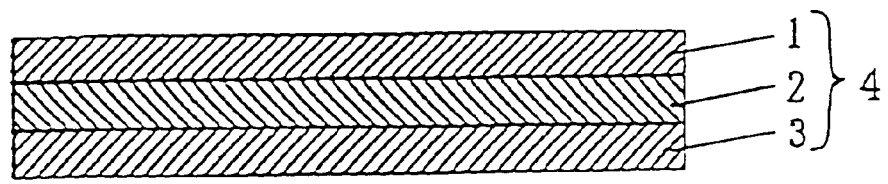
FIG. 1 is a schematic cross-sectional view illustrating one example of the release liner according to the present invention.

FIG. 1 is a schematic cross-sectional view illustrating one example of the release liner of the present invention. In this example, the release liner 4 comprises a plastic film of a three-layered structure having, as surface layers, a release functioning layer 1 and a surface film layer 3; and a reinforcement layer 2 interposed between these two surface layers.

The release functioning layer 1 is composed of a polyethylene film having a density of 0.88 to 0.92 g/cm$^3$ and a melt index not greater than 10 g/10 min. The density is preferably about 0.89 to 0.90 g/cm$^3$, while the melt index is preferably about 1 to 5 g/10 min. Densities less than 0.88 g/cm$^3$ remarkably deteriorate heat resistance. Those exceeding 0.92 g/cm$^3$, on the other hand, cause heavy peeling. Melt indexes exceeding 10 g/10 min. cause hindrance to sheet formation. In the present invention, the density and melt index (at 190° C. and a load of 2.16 kg) of the release functioning layer are values as measured in accordance with JIS K 7112 and JIS K 7210, respectively.

The release functioning layer 1 is preferred to be composed of a linear low-density polyethylene film particularly among polyethylene films. The thickness of the release functioning layer 1 is, for example, about 2 to 100 μm, preferably about 5 to 60 μm.

The surface film layer 3 which is the other surface layer (the outermost layer) has a thermal linear expansion coefficient similar to that of the release functioning layer 1. The term "similar" means, for example, that the thermal linear expansion coefficient of the surface film layer 3 falls within a range of ±50%, preferably ±30%, more preferably ±25% of the thermal linear expansion coefficient of the release functioning layer 1. If the surface film layer 3 and release functioning layer 1 are different largely in thermal linear expansion coefficient, the curl becomes eminent by heat. In the present invention, the thermal linear expansion coefficient is the value as measured in accordance with JIS K 7197.

Although there is no particular limitation imposed on the plastic film constituting the surface film layer 3 insofar as it has a thermal linear expansion coefficient similar to that of the release functioning layer 1. From the viewpoint of effectively preventing blocking of a release liner stored in the rolled form, it is preferred to use a material different from that of the release functioning layer 1 for the surface film layer 3. The term "to use a material different from that of the release functioning layer" means that the film constituting the surface film layer 3 is formed of a material different from a polyethylene film which constitutes the release functioning layer 1 and has physical properties as specified above. Specific examples of the film constituting the surface film layer 3 include polypropylene film, polypropylene-SEBS (styrene-ethylene/butylene-styrene block copolymer) copolymer film, polyethylene terephthalate film, polyimide film, nylon film, polystyrene film, ethylene-vinyl acetate copolymer film, ethylene-(meth)acrylic acid copolymer film and ethylene-(meth)acrylate copolymer film. In addition to the above described films composed of a single resin, a film formed from a mixture of different resins or a film formed from a mixture of a polyethylene resin with the above-exemplified resin can be used as a film for forming the surface film layer 3. The thickness of the surface film layer 3 is, for example, 2 to 100 μm, preferably about 5 to 60 μm.

It is preferred that the melt starting temperature of a plastic film constituting the surface film layer 3 is higher by at least 5° C., particularly at least 10° C. than that of a plastic film constituting the release functioning layer 1.

The melting point of the reinforcement layer 2 is at least 120° C., preferably at least 130° C. and more preferably at least 140° C. Although there is no particular limitation imposed on the plastic material constituting the reinforcement layer 2 insofar as it has a melting point not less than 120° C. Examples include polyester and olefin resins such as polyethylene, polypropylene, ethylene-propylene copolymer and ethylene-vinyl acetate copolymer. In the reinforcement layer 2, various additives, for example, a filler such as titanium white or silica and a deterioration preventive may be incorporated as needed. In the present invention, the melting point of the reinforcement layer 2 is a value as measured in accordance with JIS K 7121.

A release liner which is free from a reinforcement layer 2 or is provided with a reinforcement layer 2 having a melting point less than 120° C. tends to be stretched and curled by heat.

No limitation is imposed on the release liner according to the present invention insofar as it has a laminated structure of at least three layers. Accordingly, a laminated structure of four or more layers is of course embraced in the present invention. For example, the reinforcement layer (intermediate layer) may be formed from plural layers. The modulus of elasticity (at 23° C.) of the release liner is generally 100 kgf/cm$^2$ or more, preferably 150 kgf/cm$^2$ or more from the viewpoint of its strength. The total thickness of the release liner can be selected as needed within an extent not damaging the strength, handling properties or the like, but generally it is about 20 to 200 μm.

There is no limitation imposed on the production method of the release liner of the present invention and conventionally-employed lamination method of a plastic film can be employed. The release liner can be produced, for example, by the inflation method or T-die extrusion method.

According to the release liner of the present invention, since each of the density and melt index of the polyethylene film constituting the release functioning layer which is one of the surface layers fall within a specific range, the release liner has excellent peeling properties even without using a silicone material, has excellent heat resistance and processing properties and, owing that two surface layers are similar in thermal linear expansion coefficient, is substantially free from the curl due to heat. In addition, by forming the release functioning layer and surface film layer, which constitute two surface layers, from different materials, blocking of the release liner in the rolled form can be prevented effectively. The release liner according to the present invention can therefore be suitably used as a peeling layer of a silicone-free pressure-sensitive adhesive sheet in the field of electronic materials.

Pressure-sensitive Adhesive Sheet

Figure 2:
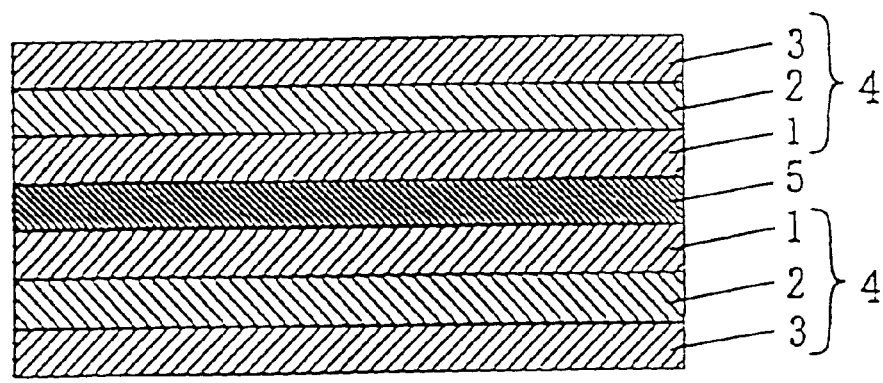
FIG. 2 is a schematic cross-sectional view illustrating one example of the pressure-sensitive adhesive sheet of the present invention.
Figure 3:
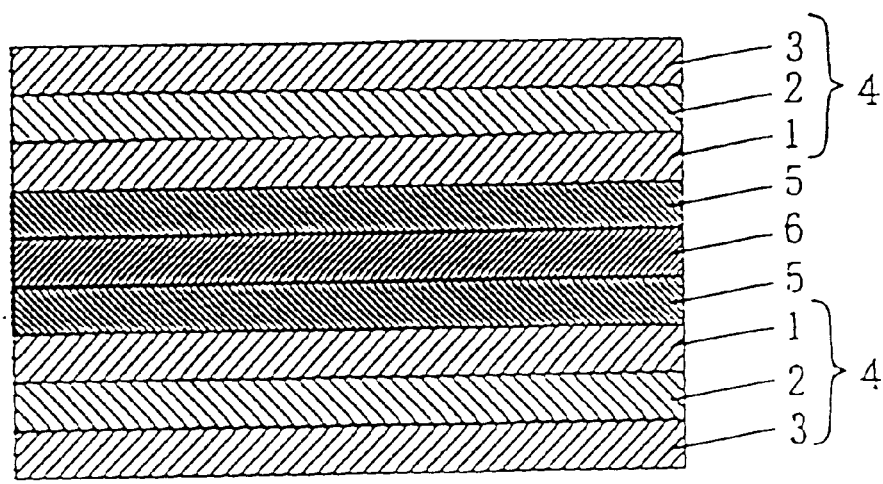
FIG. 3 is a schematic cross-sectional view illustrating another example of the pressure-sensitive adhesive sheet of the present invention, in which numerals 1 to 6 indicate a release functioning layer, a reinforcement layer, a surface film layer, a release liner, a pressure-sensitive adhesive layer, and a base material, respectively.

FIG. 2 is a schematic cross-sectional view illustrating one example of the pressure-sensitive adhesive sheet of the present invention. FIG. 3 is a schematic cross-sectional view illustrating another example of the pressure-sensitive adhesive sheet of the present invention.

In the example as illustrated in FIG. 2, two release liners 4 each composed of a release functioning layer 1, a reinforcement layer 2 and a surface film layer 3 are adhered, at the sides of the release functioning layers 1, to the opposite surfaces of a pressure-sensitive adhesive layer 5. In the example as illustrated in FIG. 3, two release liners 4 each composed of a release functioning layer 1, a reinforcement layer 2 and a surface film layer 3 are adhered, at the sides of the release functioning layer 1, to the surfaces of pressure-sensitive adhesive layers 5 formed on the opposite sides of a base material 6, respectively. These pressure-sensitive adhesive sheets are used as a double bond adhesive tape or sheet and after peeling off the release liner 4, they are provided for actual use.

No particular limitation is imposed on the pressure-sensitive adhesive which constitutes the pressure-sensitive adhesive layer 5 and various adhesives such as rubber and acrylic ones can be employed. Among them, the acrylic adhesive is particularly preferred because of a small impurity ion content.

The acrylic adhesive can be prepared by adding, to a main component composed of an acrylic polymer available by the conventional polymerization process, various additives such as crosslinking agent, tackifier, softening agent, age resistor and filler as needed.

As the above-described acrylic polymer, a copolymer of a monomer mixture obtained by adding, to an alkyl (meth) acrylate as a main component, a monoethylenically unsaturated monomer which is copolymerizable therewith can be employed for example. When the monoethyleneically unsaturated monomer is used as a comonomer, a functional group or polar group can be introduced into the resulting copolymer, resulting in an improvement in heat resistance and adhesion properties.

Examples of the alkyl methacrylate include alkyl (meth) acrylates having, at an alkyl portion thereof, about 2 to 12 carbon atoms, such as ethyl (meth)acrylate, butyl (meth) acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate and dodecyl (meth)acrylate. These alkyl (meth)acrylates may be used either singly or in combination.

Examples of the above-described monoethylenically unsaturated monomer include carboxyl-containing monomers such as acrylic acid and itaconic acid; sulfo-containing monomers such as sulfopropyl (meth)acrylate; hydroxyl-containing monomers such as hydroxyalkyl (meth)acrylate; cyano-containing monomers such as cyanoalkyl (meth) acrylate and acrylonitrile; amide-containing monomers such as acrylamide, substituted arylamide and N-vinyl caprolactam; glycidyl-containing monomers such as glycidyl acrylate; alkoxyalkyl (meth)acrylates such as 2-methoxyethyl acrylate; vinyl esters such as vinyl acetate; and styrene monomers such as styrene. These monomers may be used either singly or in combination according to the using purpose.

The acrylic polymer can be prepared by an arbitrary polymerization method. Examples thereof include an addition polymerization method such as solution polymerization, emulsion polymerization, photopolymerization with electron rays or ultraviolet rays, or a combination thereof.

In the present invention, the modulus of elasticity of the above-described pressure-sensitive adhesive layer 5 at 23° C. preferably falls within a range of $1\times10^4$ to $1\times10^6$ dyn/cm², particularly within a range of $1\times10^5$ to $7\times10^5$ dyn/cm². If the modulus of elasticity exceeds $1\times10^6$ dyn/cm², peeling occurs easily so that the release liner 4 is liable to fall off. On the other hand, if the modulus of elasticity is less than $1\times10^4$ dyn/cm², peeling becomes heavy so that peeling of the release liner 4 is liable to be difficult. In the present invention, the modulus of elasticity of the pressure-sensitive adhesive layer is the value obtained in accordance with JIS K 7127.

The thickness of the pressure-sensitive adhesive layer 5 can be selected in consideration of adhesive force or the like, and it is generally from 1 to 200 μm, preferably about from 30 to 150 μm.

As the base material 6, a plastic film such as polyester, polypropylene, polystyrene or polyvinyl chloride; a metallic foil such as aluminum foil or stainless foil; or paper such as craft paper, woodfree paper or crepe paper is used. Although the thickness of the base material 6 can be selected in consideration of handling properties, it is generally about 5 to 300 μm, preferably about 30 to 200 μm.

The pressure-sensitive adhesive sheet of the present invention can be produced by the ordinarily employed film lamination method such as coating method.

For example, the pressure-sensitive adhesive sheet as illustrated in FIG. 2 can be produced by applying a pressure-sensitive adhesive onto the surface of the release functioning layer 1 of one of two release liners 4, drying and, if necessary, cross-linking to form a pressure-sensitive adhesive layer 5 and then adhering, to the surface of the resulting pressure-sensitive adhesive layer 5, the surface of the release functioning layer 5 of the other release liner 4.

The pressure-sensitive adhesive sheet as illustrated in FIG. 2 can also be produced, for example, by applying a pressure-sensitive adhesive onto a polyethylene terephthalate film (separator) having a silicone-treated surface, drying and, if necessary, crosslinking to form a pressure-sensitive adhesive layer 5, adhering, to the surface of the resulting pressure-sensitive adhesive layer 5, the surface of the release functioning layer 1 of one of two release liners 4, peeling off the separator, and then adhering, to the exposed surface of the pressure-sensitive adhesive layer 5, the surface of the release functioning layer 1 of the other release liner 4. The pressure-sensitive adhesive sheet thus obtained is used as a base-material-free pressure-sensitive adhesive sheet comprising release liners having a silicone-free single side. The above-described method is effective when prevention of a gas, which has been generated upon heating and drying of the pressure-sensitive adhesive layer 5, from adhering to the release liner and remaining on the pressure-sensitive adhesive sheet is desired or when prevention of excessive heat from being applied to the release liner is desired.

The pressure-sensitive adhesive sheet as illustrated in FIG. 3 can be produced, for example, by applying a pressure-sensitive adhesive to one of the surfaces of a base material 6, drying and, if necessary, crosslinking to form a pressure-sensitive adhesive layer 5, adhering, to the surface of the resulting pressure-sensitive adhesive layer 5, the surface on the side of the release functioning layer 1 of one of two release liners 4, forming a pressure-sensitive adhesive layer 5 on the opposite surface of the base material 6 in a similar manner and then adhering, to the surface of the resulting pressure-sensitive adhesive layer 5, the surface of the release functioning layer 1 of the other release liner 4.

The pressure-sensitive adhesive sheet according to the present invention may be a single side adhesive tape or sheet having a pressure-sensitive adhesive layer on one side. Such a single side adhesive tape or sheet can be produced, for example, by applying a pressure-sensitive adhesive onto one of the surfaces of a base material 6, drying and, if necessary, prosslinking to form a pressure-sensitive adhesive layer 5 and then adhering, to the surface of the resulting pressure-sensitive adhesive layer 5, the surface of the release functioning layer 1 of the release liner 4.

Since the pressure-sensitive adhesive sheet according to the present invention comprises a release liner which exhibits excellent peeling properties even without using a silicone-base material, and at the same time has heat resistance and characteristics not to cause a curl, it has excellent handling properties, for example, to permit easy peeling of the release liner and no silicone compound remains on the pressure-sensitive adhesive layer after the release liner is peeled off. It is therefore suited as a silicone-free adhesive sheet or tape in the field of electronic materials, particularly, for a hard disk apparatus of a computer.

EXAMPLES

The present invention will hereinafter be described more specifically by examples. It should however be borne in mind that the present invention is not limited to or by these examples. All designations of "part" or "parts" indicate "part by weight" or "parts by weight", respectively.

Preparation Example 1

A premix was prepared using 70 parts of isooctyl acrylate, 20 parts of butyl acrylate, 10 parts of acrylic acid and 0.5 part of, as a photopolymerization initiator, 2,2-dimethoxyphenylacetophenone ("Irgacure 651", trade name; product of Ciba Geigy Corporation). The resulting premix was exposed to ultraviolet rays under a nitrogen atmosphere to cause partial polymerization, whereby a syrup which had a viscosity of about 5000 centipoises and was therefore suited for coating was obtained. To 100 parts of the partially polymerized syrup, 1 part of tetrabismethylene-3-(3'-5'-di-t-butyl-4'-hydroxyphenyl)propionate methane as a radical chain terminator and 0.2 parts of trimethylolpropane triacrylate as a crosslinking agent were added, followed by mixing, whereby a pressure-sensitive adhesive composition was obtained.

Preparation Example 2

In a flask, 90 parts of 2-ethylhexyl acrylate, 10 parts of acrylic acid, 210 parts of ethyl acetate and 0.4 part of 2,2'-azobisisobutylonitrile were charged and the system was purged sufficiently with a nitrogen gas. By solution polymerization of the resulting mixture by stirring at 60 to 80° C., a polymer solution having a viscosity of about 120 poises and a polymerization ratio of 99.0 wt. % was obtained. To 100 parts of the resulting solution, 2 parts of a polyfunctional isocyanate compound was added as a crosslinking agent, followed by mixing, whereby a pressure-sensitive adhesive composition was obtained.

Example 1

By the T-die extrusion method, two release liners (laminated plastic sheets) each composed of a 15-$\mu$m thick linear low-density polyethylene layer having a density of 0.89 g/cm$^3$, a melt index of 5 g/10 min., a thermal linear expansion coefficient of $18 \times 10^{-5}$/° C. and a melt starting temperature of 65° C. (as measured according to JIS K 7121) as a release functioning layer (to be adhered with a pressure-sensitive adhesive layer), a 50-$\mu$m thick polypropylene layer having a melting point of 140° C. as a reinforcement layer (intermediate layer) and a 15-$\mu$m thick linear low-density polyethylene layer having a thermal linear expansion coefficient of $18 \times 10^{-5}$/° C. as an outer layer (surface film layer) were obtained under the condition of 180° C.

The pressure-sensitive adhesive composition obtained in Preparation Example 1 was applied onto a 50-$\mu$m thick polyethylene terephthalate film (separator) treated with silicone, followed by photopolymerization by exposing it to ultraviolet rays of 900 mJ/cm$^2$ from a high-pressure mercury lamp having a light intensity of 5 mW/cm$^2$ under a nitrogen gas atmosphere, whereby a 50-$\mu$m thick pressure-sensitive adhesive layer (photopolymerized layer) having a modulus of elasticity of $6 \times 10^5$ dyn/cm$^2$ at 23° C. was formed. The resulting layer was then dried at 120° C. for 7 minutes in a circulating hot air drier. To the surface of the resulting pressure-sensitive adhesive layer, the surface of the release functioning layer of one of the release liners obtained above was adhered, followed by peeling of the separator. To the exposed surface of the pressure-sensitive adhesive layer, the other release liner was adhered, whereby a pressure-sensitive double bond adhesive tape was produced.

Example 2

By the T-die extrusion method, two release liners (laminated plastic sheets) each composed of a 30-$\mu$m thick linear low-density polyethylene layer having a density of 0.91 g/cm$^3$, a melt index of 2 g/10 min., a thermal linear expansion coefficient of $14 \times 10^{-5}$/° C. and a melt starting temperature of 74° C. (as measured according to JIS K 7121) as a release functioning layer (to be adhered with a pressure-sensitive adhesive layer), a 50-$\mu$m thick polyethylene-propylene copolymer layer having a melting point of 125° C. as a reinforcement layer (intermediate layer) and a 20-$\mu$m thick polypropylene-SEBS copolymer layer having a thermal linear expansion coefficient of $11 \times 10^{-5}$/° C. and a melt starting temperature of 83° C. (as measured according to JIS K 7121) as an outer layer (surface film layer) were obtained under the condition of 180° C. Even stored for a long period of time in the rolled form, the resulting release liners did not cause blocking and had good unwinding properties.

The pressure-sensitive adhesive composition obtained in Preparation Example 1 was applied onto a base material of a 75-$\mu$m thick polyethylene terephthalate film, followed by photopolymerization by exposing it to ultraviolet rays of 900 mJ/cm$^2$ from a high-pressure mercury lamp having a light intensity of 5 mW/cm$^2$ under a nitrogen gas atmosphere, whereby a pressure-sensitive adhesive layer (photopolymerized layer) having a total thickness of 100 $\mu$m was formed. To the surface of the resulting pressure-sensitive adhesive layer, the surface of the release functioning layer of one of the release liners obtained above was adhered. Similarly, to the opposite surface of the polyethylene terephthalate film used as a base material, the pressure-sensitive adhesive composition obtained in Preparation Example 1 was applied, followed by photopolymerization, whereby a pressure-sensitive adhesive layer (photopolymerized layer) having a total thickness of 125 $\mu$m was formed. Similarly, to the surface of the resulting pressure-sensitive adhesive layer, the surface of the release functioning layer of the other release liner obtained above was adhered, whereby a pressure-sensitive double bond adhesive tape using a polyethylene terephthalate film as a base material was produced.

Example 3

To the surface of the release functioning layer of the release liner (laminated plastic sheet) obtained in Example 2, the pressure-sensitive adhesive composition obtained in Preparation Example 1 was applied, followed by exposure to ultraviolet rays of 900 mJ/cm$^2$ from a high-pressure mercury lamp having a light intensity of 5 mW/cm$^2$ under a nitrogen gas atmosphere for photopolymerization, whereby a 50-$\mu$m thick pressure-sensitive adhesive layer (photopolymerized layer) having a modulus of elasticity of 6×10$^5$ cyn/cm$^2$ at 23° C. was formed. The resulting layer was dried at 120° C. for 7 minutes in a circulating hot air drier. To the surface of the resulting pressure-sensitive adhesive layer, the surface of the release functioning layer of the release liner obtained in Example 1 (laminated plastic sheet) was adhered, whereby a pressure-sensitive double bond adhesive tape was produced.

Example 4

The pressure-sensitive adhesive composition obtained in Preparation Example 2 was applied to a 50-μm thick polyethylene terephthalate film (separator) treated with silicone, followed by drying at 40° C. for 5 minutes and then at 120° C. for 7 minutes in a circulating hot air drier, whereby a 50-μm thick pressure-sensitive adhesive layer (layer obtained by solution polymerization) having a modulus of elasticity of 2×10$^5$ dyn/cm$^2$ was formed. To the surface of the resulting pressure-sensitive adhesive layer, the surface of the release functioning layer of one of the release liners obtained in Example 2 was adhered. Then, the separator was peeled off and to the exposed surface of the pressure-sensitive adhesive layer, the other release liner obtained in Example 2 was adhered, whereby a pressure-sensitive double bond adhesive tape was obtained.

Comparative Example 1

A pressure-sensitive double bond adhesive tape was obtained in the same manner as in Example 1 except for using a silicone-treated polyethylene terephthalate separator instead of the release liner (laminated plastic sheet).

Comparative Example 2

A pressure-sensitive double bond adhesive tape was produced in the same manner. as in Example 1 except for using a 25-μm thick high-density polyethylene layer having a density of 0.95 g/cm$^3$ and a melt index of 1 g/10 min. instead of the release functioning layer of the release liner (laminated plastic sheet).

Comparative Example 3

Production of a pressure-sensitive double bond adhesive tape was tried in the same manner as in Example 1 except for using a 50-μm thick linear low-density polyethylene layer having a density of 0.86 g/cm$^3$ and a melt index of 12 g/10 min. instead of the release functioning layer of the release liner (laminated plastic sheet). However, a film could not be formed, so that no pressure-sensitive double bond adhesive tape could be produced.

Comparative Example 4

In a similar manner to Example 1 except that the outer layer (surface film layer) of the release liner (laminated plastic sheet) was formed from a 15-μm thick polypropylene film having a thermal linear expansion coefficient of 6×10$^{-5}$/° C., a pressure-sensitive double bond adhesive tape was produced.

Comparative Example 5

A pressure-sensitive double bond adhesive tape was produced in the same manner as in Example 1 except that the reinforcement layer (intermediate layer) of the release liner (laminated plastic sheet) was formed from a 50-μm thick polyethylene film having a melting point of 95° C.

Evaluation Test

With regards to the pressure-sensitive double bond adhesive tapes obtained in Examples and Comparative Examples, an amount of silicone transferred to the pressure-sensitive adhesive layer, peeling property of the release liner and occurrence of a curl were measured or evaluated by the below-described methods, respectively. The results are shown in Table below.

Amount of Silicone Transferred to Pressure-sensitive Adhesive Layer

After each of the pressure-sensitive double bond adhesive tapes was allowed to stand for 24 hours in an atmosphere of 40° C., the release liners on both sides of the pressure-sensitive adhesive layer were peeled off and the amount of silicone contained in both surfaces of the pressure-sensitive adhesive layer was measured by fluorescent X-rays. In the table, the total silicone amount (kilo count per second) contained in both surfaces is shown.

Peeling Property of Release Liner

One of the release liners of each of the pressure-sensitive double bond adhesive tape was manually peeled off, followed by adhesion to an aluminum plate by a hand roller. The peeling manner of the other release liner when it was manually peeled off was observed and evaluated based on the below-described standards.

A: Good

B: Peeling of a release liner was heavy (which is comparable to peeling with a peeling force of about 2N/50 mm or more).

Occurrence of Curl

After each of the pressure-sensitive double bond adhesive tapes of A4 size was allowed to stand for 12 hours in an atmosphere of 70° C., occurrence of a curl was visually observed and evaluated according to the following standards:

A: Occurrence of a curl was hardly observed.

B: Marked occurrence of a curl was observed.

TABLE

|  | Amount of Silicone (kcps) | Peeling Properties | Occurrence of Curl |
|---|---|---|---|
| Example 1 | 0.2 | A | A |
| Example 2 | 0.0 | A | A |
| Example 3 | 0.0 | A | A |
| Example 4 | 0.2 | A | A |
| Comp. Ex. 1 | 0.4 | A | A |
| Comp. Ex. 2 | 0.2 | B | A |
| Comp. Ex. 3 | Sheet was not formed. | | |
| Comp. Ex. 4 | 0.2 | B | B |
| Comp. Ex. 5 | 0.2 | A | B |

As is apparent from the results of Table, each of the pressure-sensitive double bond adhesive tapes obtained in Examples 1 to 4 has excellent properties judging from a small amount of silicone transferred to the pressure-sensitive adhesive layer, good peeling properties and not so frequent occurrence of a curl. The pressure-sensitive double bond adhesive tape obtained in Comparative Example 5 showed marked stretching of the release liner.

While the invention has been described in detail and with reference to specific embodiments thereof, it will be apparent to one skilled in the art that various changes and modifications can be made therein without departing from the spirit and scope thereof.

What is claimed is:

1. A release liner comprising a plastic film having at least three layers, wherein two surface layers are a release functioning layer (A) comprising a polyethylene film having a density of 0.88 to 0.92 g/cm$^3$ and a melt index not greater than 10 g/10 minutes and a surface film layer (B) having a thermal linear expansion coefficient similar to that of said release functioning layer; and an intermediate layer between the two surface layers is a reinforcement layer (C) having a melting point not less than 120° C.

2. The release liner of claim 1, wherein the surface film layer (B) is formed of a material different from that of the release functioning layer (A).

3. A pressure-sensitive adhesive sheet having a pressure-sensitive adhesive layer and a release liner, wherein in the release liner comprises a plastic film having at least three layers, wherein two surface layers are a release functioning layer (A) comprising a polyethylene film having a density of 0.88 to 0.92 g/cm$^3$ and a melt index not greater than 10 g/10 minutes and a surface film layer (B) having a thermal linear expansion coefficient similar to that of said release functioning layer; and an intermediate layer between the two surface layers is a reinforcement layer (C) having a melting point not less than 120° C., and the pressure-sensitive adhesive layer is formed on the surface of the release functioning layer (A) of the release liner.

4. The pressure-sensitive adhesive sheet of claim 3, wherein the surface film layer (B) is formed of a material different from that of the release functioning layer (A).

5. The pressure-sensitive adhesive sheet of claim 3, wherein the pressure-sensitive adhesive layer has a modulus of elasticity of $1\times10^4$ to $1\times10^6$ dyn/Cm$^2$ at 23° C.

6. The pressure-sensitive adhesive sheet of claim 3, which is to be used for the hard disc apparatus of a computer.

* * * * *